United States Patent [19]

Sung et al.

[11] Patent Number: 5,419,121

[45] Date of Patent: May 30, 1995

[54] METHOD AND APPARATUS FOR REDUCTION OF POLLUTANTS EMITTED FROM AUTOMOTIVE ENGINES BY FLAME INCINERATION

[75] Inventors: Shiang Sung, New York, N.Y.; John J. Steger, Pittstown, N.J.; Joseph C. Dettling, Howell, N.J.; Patrick L. Burk, Freehold, N.J.

[73] Assignee: Engelhard Corporation, Iselin, N.J.

[21] Appl. No.: 48,496

[22] Filed: Apr. 16, 1993

[51] Int. Cl.$^6$ ................................................ F01N 3/20
[52] U.S. Cl. ......................................... 60/274; 60/284; 60/286; 60/303; 422/183; 423/212
[58] Field of Search ................. 60/274, 284, 286, 303; 422/183; 423/212

[56] References Cited

U.S. PATENT DOCUMENTS

| | | |
|---|---|---|
| 3,775,064 | 11/1973 | Berger et al. |
| 3,779,015 | 12/1973 | Maruoka |
| 3,791,143 | 2/1974 | Keith et al. |
| 4,012,905 | 3/1977 | Masaki .................... 60/286 |
| 4,106,453 | 8/1978 | Burley |
| 4,131,086 | 12/1978 | Noguchi et al. |
| 4,322,387 | 3/1982 | Virk et al. |
| 4,349,002 | 9/1982 | Allen |
| 4,359,863 | 11/1982 | Virk et al. |
| 4,429,675 | 2/1984 | Talbert |
| 4,503,671 | 3/1985 | Smith |
| 4,509,464 | 4/1985 | Hansen |
| 4,708,118 | 11/1987 | Rawlings |
| 4,715,349 | 12/1987 | Hibino et al. |

FOREIGN PATENT DOCUMENTS

| | | |
|---|---|---|
| 222031 | 7/1942 | Switzerland |
| 1372160 | 10/1974 | United Kingdom |
| 2084898 | 4/1982 | United Kingdom |
| 1437524 | 11/1988 | U.S.S.R. |

OTHER PUBLICATIONS

Patent Abstracts of Japan, vol. 11, No. 82 (M-571) Mar. 12, 1987 & JP,A,61 237 812 (Sabo Osamu Oct. 23, 1987 "Exhaust Gas Purifier of Engine".
Otsuka et al, "A fuel cell for the partial oxidation . . . ambient temperatures", NATURE, vol. 345, Jun. 21, 1990, p. 697.
Tanabe, "Niobic Acid As An Unusual Solid Material", Materials Chemistry and Physics, 17 (1987) pp. 217–225.
Domen et al, "Overall Photodecomposition of water on . . . Niobiate Catalyst", Catalysts Today, 8 (1990) pp. 77–84.
Martir et al, "The Formation of Gas-Phase . . . Molybdate Catalysts", J. Am. Chem. Soc., 1981, 103, pp. 3728–3732.
Hanson, "Engine Emissions Prove Hard to Lower", Chem. & Eng. News, Jan. 7, 1991, p. 21.
Hino et al, "Synthesis of Solid Superacid W/ Strength of H.<$-16.04^1$", J.C.S. Chem. Comm, 1980, pp. 851–852.

Primary Examiner—Douglas Hart

[57] ABSTRACT

A method of improving the performance of a pollutant abatement means, e.g., catalytic converter (16), used to purify engine exhaust gas streams and the like includes combusting a combustion mixture of air and a low ignition temperature fuel in the exhaust gas stream upstream of the catalytic converter (16) to oxidize carbon monoxide and unburned hydrocarbons, and/or to rapidly heat the catalytic converter to its operating temperature. Reaction conditions are maintained so as to cause the combustion mixture to ignite spontaneously. A control system may be used to regulate the supply of the combustion mixture in response to time lapse or temperature of the catalyst or both. The apparatus includes a fuel supply (18) and a fuel line (20) controlled by a valve (22) to deliver a low ignition temperature fuel into the exhaust gas discharge line (14) associated with the engine (12). An air pump (26) provides combustion air through an air line (28) into the exhaust gas discharge line (14). Optionally, a thermocouple (36) attached to the catalytic converter (16) signals a controller (38) to reduce or stop the flow of air and/or low ignition temperature fuel in response to the temperature of the catalytic converter (16).

22 Claims, 1 Drawing Sheet

METHOD AND APPARATUS FOR REDUCTION OF POLLUTANTS EMITTED FROM AUTOMOTIVE ENGINES BY FLAME INCINERATION

BACKGROUND OF THE INVENTION

1. Field of the Invention

The present invention relates to a method and apparatus for abating pollutants in the exhaust gas streams of internal combustion engines. More specifically, the present invention provides a method and apparatus for abating pollutants in the exhaust gas streams during the cold-start period of engine operation.

2. Related Art

It is well known that the exhausts of internal combustion or other engines contain noxious pollutants including carbon monoxide ("CO"), unburned hydrocarbons ("HC") and nitrogen oxides ("$NO_x$"). It is common practice to provide engine systems with catalysts designed to convert these noxious pollutants into relatively innocuous species such as carbon dioxide, water and nitrogen. The activity of such a catalyst varies directly with the temperature of catalyst operation, which, for catalysts used for gasoline-fueled automobile engines, is typically 300° C. to 800° C. Normally, the catalyst is heated to its operating temperature by exposure to the exhaust gases released by the engine and by exothermic reactions involved in the oxidation of CO and HC. However, it can take from about 90 to 120 seconds for a catalyst to be heated to operating temperature from ambient temperature, i.e, from a "cold start". During this warm-up period, sometimes herein referred to as "the cold-start period", an unacceptably high proportion of the noxious pollutants in the exhaust gas stream passes through the catalyst uneffected. To alleviate the discharge of these pollutants during the cold-start period, attempts have been made to place the catalyst, or a smaller, second catalyst, closer to the engine to avoid heat loss by the exhaust through the exhaust pipe, so that the catalyst is heated more quickly to its normal operation temperature.

U.S. Pat. No. 3,791,143 to Keith et al dated Feb. 12, 1974 discloses a process and apparatus for purifying exhaust gases of an internal combustion engine during a cold-start period. Two catalytic converters are placed in the exhaust gas line, an initial catalyst and a second catalyst. Supplemental fuel and air are added through a valved fuel line into the exhaust gas line upstream of the initial catalyst. The supplemental fuel may be a gas at ambient temperatures, but is preferably normally liquid, or may be a hydrocarbon boiling in the range of up to about 600° F. at atmospheric pressure, or a mixture of hydrocarbons generically described as having from 3 to 12 carbon atoms (see column 7, lines 31–37). During the cold-start period, the mixture of supplemental fuel, exhaust gas and air flow into the initial catalyst which catalyzes the combustion of the fuel and releases heat (see column 9, lines 4–9). The second catalytic converter is heated by hot effluent gases coming from the initial catalytic converter (see column 5, lines 11–13). When the second catalytic converter reaches its normal operating temperature, the initial catalytic converter may be bypassed, and the by-pass mechanism may be thermostatically controlled (see column 5, lines 38–45 and column 6, lines 5–9).

U.S. Pat. No. 3,779,015 to Maruoka dated Dec. 18, 1973 discloses an exhaust gas treatment system in which hot gases are generated by combusting an air/fuel mixture in a burner unit and are added to the exhaust gas line to bring the catalytic converter quickly up to its operating temperature. The apparatus may include thermostatic switches to control the supply of fuel in response to the temperature of the catalytic converter.

U.S. Pat. No. 4,359,863 to Virk et al dated Nov. 23, 1982 discloses an exhaust gas torch apparatus which comprises a catalytic segment through which a diesel exhaust gas stream flows before entering a diesel particulate trap. Periodically, the exhaust gas stream is preheated in an electrically powered heating zone, and is then passed into the catalytic segment to raise the catalyst to its "light-off" temperature. Supplemental fuel is then injected into the heated catalyst segment where it ignites upon contact with the catalyst. The combustion reaction travels into the particulate trap and oxidizes particulates trapped therein to regenerate the trap. The fuel may be propane or a suitable fluid such as diesel oil or kerosene (see column 5, lines 57–62).

SUMMARY OF THE INVENTION

The present invention provides a method for abating pollutants in the exhaust gas stream of an engine having an exhaust gas discharge line through which the exhaust gas stream flows between the engine and a pollutant abatement means such as a catalytic converter or a particulate filter. Specifically, the method comprises, at least during the cold-start period prior of engine operation, the step of feeding a spontaneously combustible combustion mixture comprising air and a low ignition temperature fuel into the exhaust gas stream at a feed point located upstream of the pollutant abatement means, under conditions sufficient to cause spontaneous ignition of the combustion mixture. The combustion mixture is then combusted in a combustion zone upstream of the pollutant abatement means thereby to initiate the oxidation of at least some of the pollutants in the exhaust gas stream.

According to aspect of the invention, the process may further comprise monitoring the temperature of the pollutant abatement means and reducing the amount of the combustion mixture introduced into the exhaust gas stream as the temperature of the pollutant abatement means increases. The introduction of the combustion mixture into the discharge line may be ceased when the pollutant abatement means attains a predetermined temperature, for example, the light-off temperature of a pollutant abatement catalyst.

According to still another aspect of the invention, one or both of the air and the low ignition temperature fuel may be preheated before introducing the combustion mixture into the exhaust gas stream. The preheating may be sufficient to introduce the combustion mixture to the exhaust gas stream at least at the autoignition temperature of the mixture, which varies, of course, with low ignition temperature fuel that was used. Generally, suitable fuels provide a combustion mixture which may thus be preheated to its auto-ignition temperature, which may be from about 10° C. to 300° C., preferably from about 50° C. to 250° C., more preferably from 50° C. to 130° C., as it is fed into the exhaust gas stream. For example, at least one of the air and the low ignition temperature fuel may be heated to a temperature in the range of about 100° C. to 500° C. The low ignition temperature fuel may comprise at least one fuel selected from the group consisting of p/m-di-isopropyl benzene; carbon disulfide; 1,4-dioxane; 2-ethylhexanal; n-propyl ether; methyl ethyl ether, methyl isoamyl ketone; dibutyl ether; diethylene glycol monobutyl ether; diethyl glycol; heptane; 2-ethylhexanol; ethylcyclohexane; gasoline; tetradecane; iso nonane; octane; decane; kerosene; didecyl ether; 3- or 4-ethyloctane; cleaning solvent; dodecylene; and n-dibutyl tartrate. For example, the low ignition temperature fuel may comprise one or more fuels selected from the group consisting of p/m-di-isopropyl benzene; 2-ethylhexanal; 1,4-dioxane and dibutyl ether.

The present invention also provides a non-catalyzed combustion apparatus for use in an internal combustion engine system comprising an internal combustion engine, an exhaust gas discharge line connected to the engine to guide the exhaust gas stream from the engine and pollutant abatement means mounted in the flow path of the exhaust gas stream. The pollutant abatement means may comprise pollutant abatement catalyst or a particulate filter, which may optionally comprise a catalytic component to catalyze the oxidation of unburned hydrocarbons and carbon monoxide emitted from the internal combustion engine, and the combustion of carbonaceous particles present in the exhaust gas stream in the case of the diesel engine. The apparatus of the invention comprises a fuel source for providing a low ignition temperature fuel and a fuel line connected between the fuel source and the exhaust gas discharge line for introducing the low ignition temperature fuel into the exhaust gas discharge line upstream of the pollutant abatement means. Valve means are connected in the fuel line for controlling the flow of low ignition temperature fuel into the discharge line. The apparatus further comprises an air feed means connected in flow communication to the exhaust gas discharge line and positioned to introduce air into the exhaust gas discharge line so that the air intermingles with the low ignition temperature fuel to provide a spontaneously combustible combustion mixture in the discharge line to establish a pollutant incineration zone upstream of the pollutant abatement means.

According to one aspect of the invention the apparatus may comprise a gauze disposed in the incineration zone which may comprise a catalytic material effective for the conversion of unburned hydrocarbons into innocuous substances. The gauze may comprise thermally conductive materials and may be dimensioned and configured to distribute the heat produced by the combustion of the combustion mixture across the gas discharge line. The catalytic material in the gauze may comprise at least one of a transition metal, a noble metal or oxides or combinations thereof. For example, the catalytic material may be selected from the group consisting of one or more of platinum, palladium, rhodium, ruthenium, iridium, silver and gold, or oxides or combinations thereof.

According to another aspect of the invention, the apparatus may comprise heating means dimensioned and configured to heat at least one of the low ignition temperature fuel, the air and the combustion mixture before they are introduced into the exhaust gas stream. The heating means may comprise a portion of at least one of the fuel line and the air feed means being disposed in heat exchange relation to the exhaust gas discharge line, to allow the heat of the exhaust gas stream to preheat at least one of the fuel and the air before they are intermixed with the exhaust gas stream.

According to still another aspect of the present invention, the apparatus may further comprise thermocouple means operably connected to the pollutant abatement means, and control means responsive to the thermocouple means for controlling the valve and the air pump in response to the temperature of the pollutant abatement means. The control means may comprise timer means to operate the valve and the air pump according to predetermined time intervals.

DETAILED DESCRIPTION OF THE INVENTION AND A PREFERRED EMBODIMENT THEREOF

The present invention defines a method and apparatus for abating pollutants contained in the exhaust gas stream of an internal combustion engine or a diesel engine, particularly during the cold-start period of engine operation, during which time the exhaust gas stream is laden with carbon monoxide and unburned hydrocarbons. When the engine is equipped with pollutant abatement means comprising a particulate trap to filter the exhaust gas stream, the cold-start period of operation quickly fouls the filter. On the other hand, the pollutant abatement means may comprise a conventional pollution abatement catalyst to convert such pollutants into innocuous substances. Such catalysts are typically below their operating temperatures during this period. According to the present invention, a spontaneously combustible combustion mixture of a low ignition temperature fuel and air is introduced into the exhaust gas stream at a point upstream of the pollutant abatement means, e.g., the catalyst, under conditions which allow the combustion mixture to combust spontaneously. This combustion abates the emission of carbon monoxide and unburned hydrocarbon pollutants in both or at least one of two ways, i.e., by initiating the oxidation of the unburned pollutants, thus removing them from the exhaust gas stream, and/or by producing heat which then flows downstream to accelerate the heating of a pollutant abatement catalyst to its operative temperature. The present invention, by employing a spontaneously combustible combustion mixture comprising air and a low ignition temperature fuel, provides for the incineration of unburned pollutants and the production of heat in the exhaust gas stream without the use of a separate catalyst or other combustion ignition means to initiate combustion of the air/fuel mixture.

Figure 1:
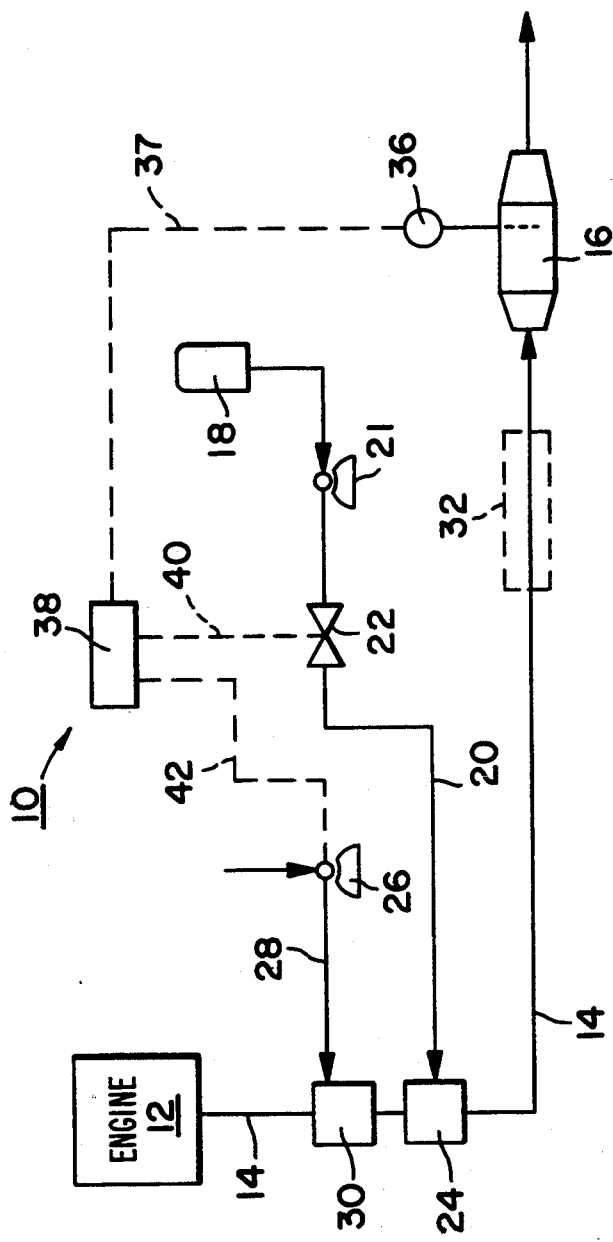
FIG. 1 is a schematic diagram of an engine and exhaust system incorporating an incineration apparatus according to one embodiment of the present invention.

FIG. 1 is a schematic view of an engine and exhaust system 10 including a combustion apparatus according to an embodiment of the present invention. In the illustrated embodiment, engine 12 is an internal combustion engine, such as a gasoline-powered engine or a diesel engine, and is fitted with an exhaust gas discharge line 14 which conducts the engine exhaust gas stream to a pollutant abatement means comprising a catalytic converter 16. Catalytic converter 16 comprises, as is well known in the art, a suitable canister which contains a conventional catalyst for catalyzing the conversion of noxious pollutants such as unburned hydrocarbons ("HC"), carbon monoxide ("CO") and, in the case of gasoline-fueled engines, nitrogen oxides ("NOx") contained within the exhaust gas stream emitted by engine 12. Such catalysts are well known and may comprise oxidation catalysts to oxidize CO and HC to $CO_2$ and $H_2O$ and reduction catalysts to reduce NOx to nitrogen. The reduction and oxidation catalysts may be placed in the exhaust gas discharge line 14 in series, or a so-called "three-way" conversion catalyst may be used, which catalyzes the substantially simultaneous oxidation of HC and CO and reduction of NOx. Many catalysts are well-known for such purpose, for example, catalytic materials containing one or more platinum group metals diborane ($B_2H_6$) has an autoignition temperature of about 40° C.; and although it would therefore easily ignite in the exhaust gas streams it poses a safety hazard due to its high toxicity. Generally, the low ignition temperature fuels used in accordance with the present invention, have autoignition temperatures in the range of from about 50° C. to 300° C., preferably 50° C. to 250° C. and more preferably 50° C. to 130° C. Non-limiting examples of preferred candidate low ignition temperature fuels which may be used in accordance with the present invention are listed in TABLES I and II.

TABLE I

| | Non-Explosive, Autoignitable Fuels | | | | | | |
|---|---|---|---|---|---|---|---|
| | Auto-Ignit. | Flamm. in Air, % | | Hazard[a] Levels | Flash | Temp. (°C.) | |
| Fuel | Temp. (°C.) | Low | High | A,B,C | Point (°C.) | M | B |
| p/m-Di-Isopropyl-benzene $C_{12}H_{18}$ | 77 | 0.7[b] | 4.9[b] | 2[c],3,0 | 81[b] | | 159 |
| Carbon Disulfide $CS_2$ | 90 | 1.3 | 50. | 2,3,0 | −30 | −111 | 46 |
| 1,4-Dioxane $C_4H_8O_2$ | 180 | 2.0 | 22.0 | 2,3,1 | 12 | | 101 |
| 2-Ethylhexanal $C_8H_{16}O$ | 190 | 0.9 | 7.2 | 2,2,1 | 44 | | 163 |
| n-Propyl Ether $C_6H_{14}O$ | 188 | 1.3 | 7.0 | —,3,0 | 21 | | 90 |
| Methyl Ethyl Ether $C_3H_8O$ | 190 | 2.0 | 10.1 | 2,4,1 | −37 | | 11 |
| Methyl Isoamyl Ketone $C_7H_{14}O$ | 191 | 1.0 (at 93° C.) | 8.2 | 1,2,0 | 36 | | 146 |
| Dibutyl Ether $C_8H_{18}O$ | 194 | 1.5 | 7.6 | 2,3,0 | 25 | | 141 |
| Diethylene Glycol Monobutyl Ether | 204 | 0.9 | 24.6 | 1,2,0 | 78 | | 231 |
| Diethyl Glycol $C_6H_{14}O_2$ | 205 | — | — | —,3,0 | 35 | | 122 |
| Heptane $C_7H_{16}$ | 204 | 1.1 | 6.7 | 1,3,0 | −4 | | 98 |
| 2-Ethylhexanol $C_8H_{18}O$ | 231 | 0.9 | 9.7 | 2,2,0 | 73 | | 182 |
| Ethylcyclohexane $C_8H_{16}$ | 238 | 0.9 | 6.6 | 1,3,0 | 35 | | 132 |
| Gasoline | 440 | 1.3 | 7.1 | 1,3,0 | −45 | | 182 |

[a]Based on "Fire Protection Guide on Hazardous Materials", 1986, pages 325M-7 to 325M-8, Hazard Categories: A — Health; B — Flammability; C — Reactivity.

such as platinum, palladium and rhodium, dispersed on a high surface area support such as a predominantly gamma alumina support. The catalytic material may contain other components such as ceria and/or other base metal oxides such as nickel oxide, iron oxide and/or manganese oxides, and various other stabilizers and promoters. As is well known, such catalytic materials may be coated as a washcoat onto the walls of the gas flow passages of a refractory support, such as a stainless steel or ceramic-like support, e.g., a cordierite support having a plurality of fine, parallel gas flow passages extending therethrough. If engine 12 is a diesel engine, the pollutant abatement means may comprise a particulate trap for removing particulates from the exhaust gas stream. An oxidation catalyst may be used in conjunction with the particulate trap, as is known in the art.

The apparatus according to the present invention includes a fuel supply 18 to provide a fuel having a low ignition temperature. The ignition temperature of such a fuel should be below about 300° C., for example, between about 50° C. and 250° C. The choice of fuel is dictated in part by the functional requirement that the fuel spontaneously combust when mixed with air at temperatures attained by heat exchange with exhaust gas stream emitted during a "cold-start" period or, more advantageously, at ambient temperatures, as described below. The propensity toward spontaneous combustion generally increases with lower ignition temperatures, but this characteristic must be balanced against the safety hazard presented by fuels which ignite so easily, or which present other hazards such as high toxicity. For example, propargyl alcohol, which has a boiling point of only 115° C., is relatively unstable, and is therefore not a preferred fuel. On the other hand, (A) Health: Only hazards arising out of an inherent property of the material are considered. The following explanation is based upon protective equipment normally used by fire fighters.

1. Materials only slightly hazardous to health. It may be desirable to wear self-contained breathing apparatus.
2. Materials hazardous to health, but areas may be entered freely with full-faced mask self-contained breathing apparatus which provides eye protection.
3. Materials extremely hazardous to health but areas may be entered with extreme care. Full protective clothing, including self-contained breathing apparatus, coat, pants, gloves, boots and bands around legs, arms and waist should be provided. No skin surface should be exposed.
4. Materials too dangerous to health to expose fire fighters. A few whiffs of the vapor could cause death or the vapor or liquid could be fatal on penetrating the fire fighter's normal full protective clothing. The normal full protective clothing and breathing apparatus available to the average fire department will not provide adequate protection against inhalation or skin contact with these materials.

(B) Flammability: Susceptibility to burning is the basis for assigning degrees within this category.

1. Materials that must be preheated before ignition can occur.
2. Materials which must be moderately heated before ignition will occur.

3. Materials which can be ignited under almost all normal temperature conditions.

(C) Reactivity (Stability): The assignment of degrees in the reactivity category is based upon the susceptibility of materials to release energy either by themselves or in combination with water. Fire exposure was one of the factors considered along with conditions of shock and pressure.
1. Materials which (in themselves) are normally stable but which may become unstable at elevated temperatures and pressures or which may react with water with some release of energy but not violently. Caution must be used in approaching the fire and applying water.
2. Materials which (in themselves) are normally unstable and readily undergo violent chemical change but do not detonate. Includes materials which can undergo chemical change with rapid release of energy at normal temperatures and pressures or which can undergo violent chemical change at elevated temperatures and pressures. Also includes those materials which may react violently with water or which may form potentially explosive mixtures with water.
3. Materials which (in themselves) are capable of detonation or of explosive decomposition or of explosive reaction but which require a strong initiating source or which must be heated under confinement before initiation. Includes materials which are sensitive to thermal or mechanical shock at elevated temperatures and pressures or which react explosively with water without requiring heat or confinement.

[b] Estimated
[c] Both p- and m-DIPB are not volatile and therefore their LC50 values cannot be determined in mice, according to L. P. Pavlova (see Chemical Abstracts CA74(19): 97296 q). In acute experiments, p- and m-DIPB do not differ from other alkyl derivatives of benzene.

gas discharge line 14. Preferably, the fuel is in liquid form, but in other embodiments the fuel may be in solid or gaseous form. If the fuel is a solid at ambient temperatures, it may be formed into pellets, and a conventional pellet delivery means as known in the chemical and food processing industries can be used. Fuel pellets can be dropped into air line 28 within which it will travel to exhaust gas discharge line 14, where it will melt and then vaporize to provide a combustion mixture. Preferably, the pellets are sized so that a single pellet contains enough fuel to heat the catalyst for at least one cold-start period.

Preferably, before fuel is introduced into exhaust gas discharge line 14, it is preheated to at least its autoignition temperature by heating means incorporated into the system. The heating means may be an independent heat source, such as an electric heating coil powered by the engine and/or a battery but, preferably, the heating means is a heat exchange zone 24 in which fuel line 20 is disposed in heat exchange relation to exhaust gas discharge line 14 so that the fuel within fuel line 20 is heated by the engine 12 exhaust gas stream passing through exhaust gas discharge line 14. Even during the initial cold-start period the exhaust gas stream of, for example, a gasoline fueled passenger automobile engine will typically be at a temperature of about 400° to 800° C. and thus be more than hot enough to heat the fuel to its autoignition temperature.

The system 10 further includes air feed means comprising an air pump 26 which pumps air as needed for combustion of the fuel through air line 28 into exhaust gas discharge line 14. Preferably, like fuel line 20, air line 28 passes through a heat exchange zone 30 so that the air is preheated by heat exchange with the exhaust gas stream before it is intermixed with the fuel. Thus, in the illustrated embodiment, the air as well as the fuel is

TABLE II

| | Autoignitable Fuels (Materials Not Posing Health Hazards) | | | | | | |
|---|---|---|---|---|---|---|---|
| | Auto-Ignit. | Flamm. in Air, % | | Hazard[a] Levels | Flash | Temp. (°C.) | |
| Fuel | Temp. (°C.) | Low | High | A,B,C | Point (°C.) | M | B |
| Tetradecane $C_{14}H_{30}$ | 200 | 0.5 | — | 0,1,0 | 100 | | 253 |
| Iso Nonane $C_9H_{20}$ | 205 | — | — | 0,3,0 | — | | 142 |
| Octane $C_8H_{18}$ | 206 | 1.0 | 6.5 | 0,3,0 | 13 | | 126 |
| Decane $C_{10}H_{22}$ | 210 | 0.8 | 5.4 | 0,2,0 | 46 | −30 | 174 |
| Fuel Oil No. 1 (Kerosene) | 210 | 0.7 | 5.0 | 0,2,0 | 43–72 | | 151 −301 |
| Didecyl Ether $C_{20}H_{42}O$ | 215 | — | — | 0,1,0 | — | | — |
| 3/4-Ethyloctane $C_{10}H_{22}$ | 229 | — | — | 0,2,0 | — | | 164 |
| Cleaning Solvent[b] 140(60) class | 234 | 0.8 | — | 0,2,0 | >59 | — | >181 |
| Dodecylene $C_{12}H_{24}$ | 255 | — | — | 0,1,0 | <100 | −31 | 208 |
| n-Dibutyl Tartrate $C_{12}H_{22}O_5$ | 284 | — | — | 0,2,0 | 91 | | 343 |

[a]For Hazard categories and levels, see footnote (a) in Table I.
[b]Other HCs, such as butylcyclo (hexane/pentane), have properties similiar to the cleaning solvent.

Other fuels suitable for use in the present invention may be found in the publication "Fire Protection Guide For Hazardous Materials", 9th Edition, 1986, where they are designated as having a hazard rating of 2 or lower for the health and activity categories and as having an autoignition temperature below 300° C. In addition, such fuels as propargyl alcohol, azobisisobutyronitrile, dimethylsulfate, dimethyl sulfoxide and dimethyl decalin as well as other hydrocarbons and oxygenates, may be used in accordance with the present invention.

Fuel line 20 provides a flow path between fuel supply 18 and the interior of exhaust gas discharge line 14, and is fitted with a fuel pump 21 and a fuel valve 22 to control the flow of fuel through fuel line 20 into exhaust heated by indirect heat exchange. Heat exchange zones 24 and 30 are schematically illustrated as discrete zones along a short segment of exhaust gas discharge line 14. Although they may physically have such configurations, as a practical matter the physical design of heat exchange zones 24 and 30 may be such that a portion of fuel line 20 and air feed line 28 passes into and extends within exhaust gas discharge line 14 over a length designed to achieve the necessary heat exchange. Thus, in FIG. 1 separate lines carrying the heated fuel and air out of, respectively, heat exchange zones 24 and 30, are not shown.

Figure 2:
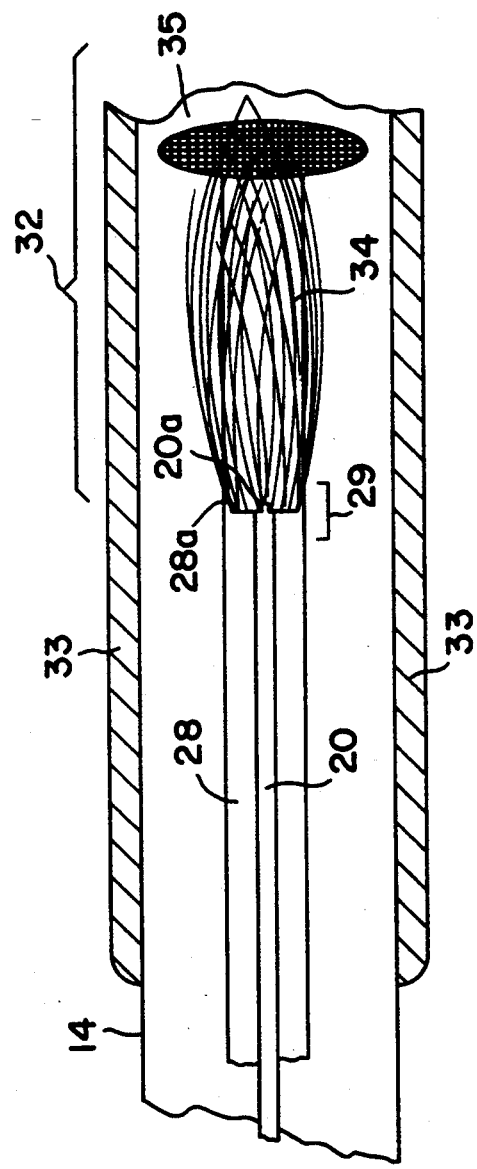
FIG. 2 is a schematic view of the incineration zone of the exhaust system of FIG. 1.

The preheated fuel and air are intermixed within exhaust gas discharge line 14 to form a combustion mixture in an incineration zone 32 upstream of catalytic converter 16. Incineration zone 32 is shown in detail in FIG. 2, which shows a thermal insulating material 33 lining the exterior of exhaust gas discharge line 14 and extending about incineration zone 32, and fuel line 20 positioned concentrically within air line 28 upstream of the discharge ends or outlets 20a, 28a of, respectively, fuel line 20 and air feed line 28. This arrangement provides for efficient intermixing of fuel and air at the respective outlets 20a, 28a, providing in effect a burner at 29. The outlets 20a, 28a may be configured to atomize the liquid fuel into a mist of droplets of less than 10 microns diameter.

The air/fuel ratio, the temperature attained by the air and fuel in the respective heat exchange zones at which the fuel and air are discharged into it work together to cause the air and fuel mixture to ignite spontaneously in incineration zone 32, to create a flame 34 within exhaust gas discharge line 14. Different fuels all autoignite in combustion mixtures having different ranges of proportions of air to fuel. One fuel, 2-ethylhexanol, creates an autoignitable combustion mixture in air/fuel ratios of from 9.3:1 to 110:1. The acceptable range of air/fuel ratios for other fuels can easily be determined by those skilled in the art, but is generally from about 0.4:1 to 200:1. The low ignition temperature fuel should be added to the gas stream in a combination mixture sufficient to heat the exhaust gas from ambient temperatures to 350° C. within 10 seconds, and at a feed rate sufficient to sustain flame combustion. For example, a feed rate of from about 0.6 to 1.5 grams per second is appropriate for p-di-isopropylbenzene. The resulting combustion generates heat in the exhaust gas stream which flows through exhaust gas discharge line 14 into catalytic converter 16, which is thus heated much more quickly to its operating temperature than it would without the heat of combustion generated in incineration zone 32. Flame 34 also serves to oxidize at least some of the unburned hydrocarbons and carbon monoxide present in the exhaust gas stream emitted from engine 12. This oxidation of HC and CO pollutants reduces the total quantity of unoxidized pollutants which must be treated by catalytic converter 16, and further contributes to the overall performance of catalytic converter 16.

Optionally, a mesh or gauze 35 can be positioned downstream of burner 29 in incineration zone 32. Gauze 35 is preferably made of catalytic materials such as transition metals or metal oxides, especially those in Groups VIII, I, IV, V, VI and VII. Most preferable materials are noble metals such as Pt, Pd, Rh, Ru, Ir, Ag, Au. Alternatively, gauze 35 can also be made of corrosion resistant alloy for high temperature applications, and may optionally carry a catalytic coating comprising any of the foregoing catalysts, e.g., in the form of a catalytic washcoat slurry comprising a catalyst material dispersed on particles of a refractory inorganic oxide, as is well-known in the art of producing automotive catalytic converters. The heat generated from flame 34 can be conducted and/or convected to the gauze, and quickly activates the catalyst material on or in gauze 35. Since gauze 35 may comprise thin wires and visually serves as a screen or sieve, it may be configured and dimensioned to extend substantially across the flow path in line 14, to distribute heat from burner 29 more uniformly in the exhaust gas stream, thus facilitating the incineration of pollutants in incineration zone 32. Thus, gauze 35 can further reduce the quantity of pollutants that must be treated by catalytic converter 16.

When used with a diesel engine, a particulate trap may be disposed within or immediately upstream of catalytic converter 16. The life of the particulate trap is extended through the use of the invention because at least some of the carbonaceous particulates produced during the cold-start period, which would otherwise foul the trap, are oxidized by flame 34.

In the illustrated embodiment, system 10 includes an optional thermocouple 36 which monitors the temperature of the catalyst bed of catalyst converter 16. Thermocouple 36 may transmit this temperature information via signal line 37 to an associated controller 38 which controls the operation of fuel valve 22 and air pump 26 via control lines 40, 42. As thermocouple 36 reports increasing temperatures in catalytic converter 16, controller 38 may decrease the quantities of air or fuel or both introduced into exhaust gas discharge line 14 to the point of complete shut-off when the catalyst bed of catalytic converter 16 has reached its normal operating temperature, typically a temperature of at least about 300° C. Alternatively, other means for controlling the quantities of air and fuel introduced into exhaust gas discharge line 14 may be used. For example, controller 38 may operate in response to a timer programmed to emit a shut-down signal after a preselected time period following start-up of the engine, the time period being calculated to allow catalytic converter 16 to attain a satisfactory temperature, e.g., its operating temperature. This temperature control aspect of the invention is also useful in connection with particulate traps, so that damage to the trap due to over-temperature can be avoided.

The present invention is utilizable with a gasoline-fueled internal combustion engine system including a catalytic converter and with a diesel engine exhaust system including a particulate filter for removing particulate pollutants from the exhaust gas stream and, optionally, an oxidation catalyst, and generally with any system for catalytically purifying an exhaust gas stream wherein rapid attainment of catalyst operating temperature is important. In the case of a diesel exhaust system, the incineration in the exhaust pipe upstream of the filter of some of the particulate pollutants in the exhaust gas stream, as taught by this invention, will extend the life of the particulate filter and reduce the overall volume of soot received by the filter by combusting some of the soot. In addition, if the particulate filter comprises a catalyst for the combustion of unburned hydrocarbons and/or the oxidation of carbon monoxide, the incineration of pollutants upstream of the filter, as taught by the present invention, offers the same advantage as with respect to automotive catalysts, the heating of the catalyst more quickly to its operating temperature.

While the present invention has been described with respect to a specific illustrated embodiment, it will be clear to those skilled in the art that the illustrated embodiment does not represent a limitation on the invention, and that variations and features thereof not shown in the illustrations still fall within the spirit and scope of the invention and the appended claims.

What is claimed is:

1. A method for abating pollutants in the exhaust gas stream of an engine having an exhaust gas discharge line between the engine and a pollutant abatement means through which the exhaust gas stream flows, the method comprising:

at least during a cold-start period of engine operating, introducing a spontaneously combustible combustion mixture comprising air and a low ignition temperature fuel into the exhaust gas stream at a feed point located upstream of the pollutant abatement means under conditions sufficient to cause spontaneous ignition of the combustion mixture in a combustion zone upstream of the pollutant abatement means whereby to initiate the oxidation of some of the pollutants in the exhaust gas stream.

2. The method of claim 1 further comprising monitoring the temperature of the pollutant abatement means and reducing the amount of the combustion mixture introduced into the exhaust gas stream as the temperature of the pollutant abatement means increases.

3. The method of claim 2 including terminating the introduction of the combustion mixture after the pollutant abatement means has attained a predetermined temperature.

4. The method of claim 3 wherein the pollutant abatement means comprising a catalyst effective for converting at least some of the pollutants to innocuous substances and further comprising heating the catalyst to the predetermined temperature using the heat of combustion of the combustion mixture.

5. The method of claim 3 or claim 4 wherein the predetermined temperature is the light-off temperature of the catalyst.

6. The method of claim 1 further comprising preheating one or both of the air and the low ignition temperature fuel before feeding the combustion mixture into the exhaust gas stream.

7. The method of claim 6 wherein preheating results in the combustion mixture attaining its auto-ignition temperature.

8. The method of claim 6 wherein the combustion mixture attains a temperature of at least from about 10° C. to 300° C. as it is fed into the exhaust gas stream.

9. The method of claim 6 wherein one or both of the air and the low ignition temperature fuel are preheated to a temperature in the range of from about 100° C. to 500° C.

10. The method of claim 1 or claim 5 wherein the low ignition temperature fuel has an autoignition temperature below about 300° C.

11. The method of claim 10 wherein the autoignition temperature of the low ignition temperature fuel is from about 100° C. to 250° C.

12. The method of claim 1 wherein the low ignition temperature fuel comprises at least one fuel selected from the group consisting of p/m-di-isopropyl benzene; carbon disulfide; 1,4-dioxane; 2-ethylhexanol; n-propyl ether; methyl ethyl ether, methyl isoamyl ketone; dibutyl ether; diethylene glycol monobutyl ether; diethyl glycol; heptane; 2-ethylhexanol; ethylcyclohexane;. gasoline; tetradecane; iso nonane; octane; decane; kerosene; didecyl ether; 3- or 4-ethyloctane; cleaning solvent; dodecylene; and n-dibutyl tartrate.

13. The method of claim 12 wherein the low ignition temperature fuel comprises at least one fuel selected from the group consisting of p/m-di-isopropyl benzene; 2-ethylhexanal; 1,4-dioxane and dibutyl ether.

14. A combustion apparatus for abating unburned hydrocarbon pollutants in a pollution abatement system for a hydrocarbon-fueled combustion process having an exhaust gas discharge line connected in flow communication between the engine and a pollutant abatement means, the apparatus comprising:

a fuel source for providing a low ignition temperature fuel;

a fuel line connected between the fuel source and the discharge line and positioned to introduce the low ignition temperature fuel into the discharge line upstream of the pollutant abatement means;

valve means connected in the fuel line for controlling the flow of the low ignition temperature fuel into the exhaust gas discharge line; and air feed means connected in flow communication to the exhaust gas discharge line and positioned to introduce air into the discharge line so that the air intermingles with the low ignition temperature fuel to provide a spontaneously combustible combustion mixture in the discharge line whereby to establish a pollutant incineration zone upstream of the pollutant abatement means.

15. The apparatus of claim 14 further comprising a gauze disposed in the incineration zone, the gauze comprising a catalytic material effective for the conversion of unburned hydrocarbons into innocuous substances.

16. The apparatus of claim 15 wherein the gauze comprises thermally conductive materials and is dimensioned and configured to distribute the heat produced by the combustion of the combustion mixture across the exhaust gas discharge line.

17. The apparatus of claim 15 or claim 16 wherein the catalytic material comprises at least one of a transition metal, a noble metal or oxides or combinations thereof.

18. The apparatus of claim 17 wherein the catalytic material is selected from the group consisting of one or more of platinum, palladium, rhodium, ruthenium, iridium, silver and gold, or oxides or combinations thereof.

19. The apparatus of claim 14 further comprising heating means dimensioned and configured to heat at least one of the low ignition temperature fuel, the air and the combustion mixture before they are introduced into the exhaust gas stream.

20. The apparatus of claim 19 wherein the heating means comprises a portion of at least one of the fuel line and the air feed means disposed in heat exchange relation with the exhaust gas discharge line, whereby the exhaust gas stream preheats at least one of the fuel and the air before they are introduced into the exhaust gas stream.

21. The apparatus of claim 14 or claim 19 further comprising thermocouple means operably connected to the pollutant abatement means and control means responsive to the thermocouple means, for controlling the valve means and the air feed means in response to the temperature of the pollutant abatement means.

22. The apparatus of claim 14 or claim 19 further comprising control means for controlling the valve means and the air feed means, wherein the control means comprises timer means whereby to operate the valve means and the air feed means according to predetermined time intervals.

* * * * *